United States Patent [19]
Mitchell

[11] Patent Number: 5,277,213
[45] Date of Patent: * Jan. 11, 1994

[54] PORTABLE, FOLDABLE CANOPY FOR BABY STROLLERS

[76] Inventor: Stephen E. Mitchell, 17 La Cascada, Rancho Santa Marguerita, Calif. 92688

[*] Notice: The portion of the term of this patent subsequent to Sep. 11, 2008 has been disclaimed.

[21] Appl. No.: 421,969

[22] Filed: Oct. 16, 1989

[51] Int. Cl.$^5$ ............................................. E04H 15/06
[52] U.S. Cl. .................................. 135/88; 280/47.38; 296/95.1; 296/97.21
[58] Field of Search ................. 135/88, 90; 280/47.38; 296/95.1, 78.1, 97.21

[56] References Cited

U.S. PATENT DOCUMENTS

| | | | |
|---|---|---|---|
| 1,080,628 | 12/1913 | Grissim | 297/184 |
| 2,789,863 | 4/1957 | Shimabukuro | 135/88 |
| 2,797,961 | 7/1957 | McKay | 296/95.1 |
| 3,279,845 | 10/1966 | Lutz | 296/95.1 |
| 3,840,161 | 10/1974 | Boggs | 135/88 |
| 4,784,433 | 11/1988 | Parnell-Ayres | 297/184 |
| 4,848,825 | 7/1989 | Niernberger | 296/95.1 |

Primary Examiner—Henry E. Raduazo
Attorney, Agent, or Firm—Leonard Tachner

[57] ABSTRACT

A foldable canopy, primarily for baby strollers and the like. The canopy comprises a top member, a rear n„ember and a pair of side members formed from a unitary planar foldable material such as cardboard, plastic and the like. The material is cut and scored to provide a preselected pattern which when folded into its fully assembled configuration, provides a convenient means for attachment to a stroller for blocking sunlight, rain, snow and other inclement environmental conditions which might otherwise reach the child in the stroller to which the canopy is connected. The canopy is configured to be installed at a position above and separated from a child in the stroller so that it does not otherwise interfere with the safety and comfort of the child.

3 Claims, 3 Drawing Sheets

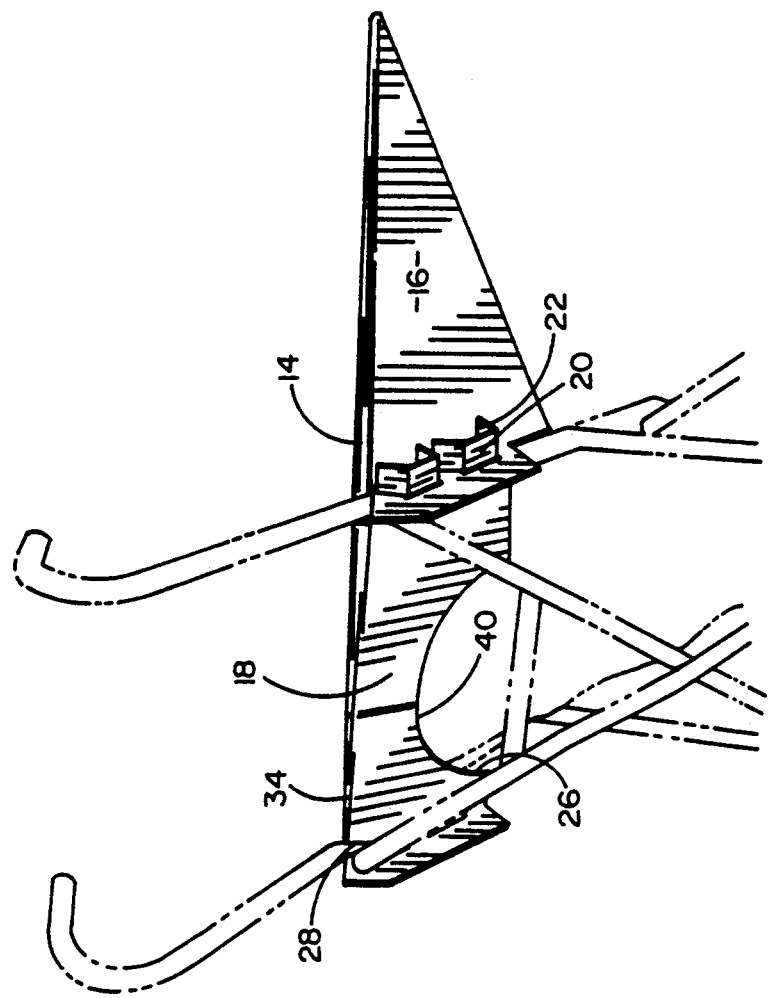
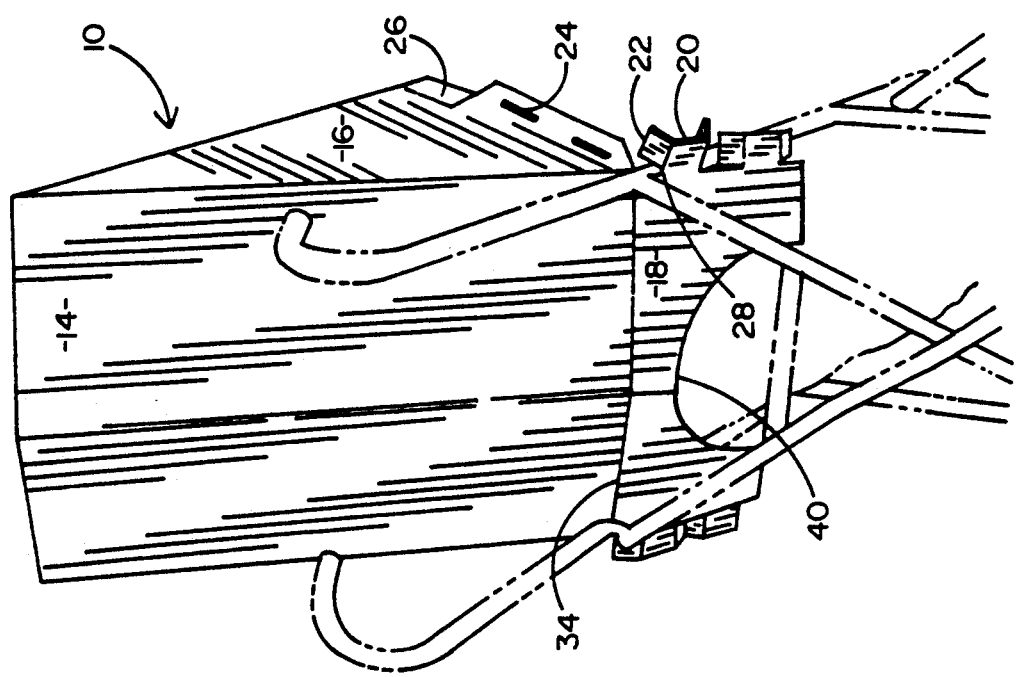

PORTABLE, FOLDABLE CANOPY FOR BABY STROLLERS

BACKGROUND OF THE INVENTION

1. FIELD OF THE INVENTION

This invention relates generally to accessories for baby strollers and more specifically to a portable, foldable canopy that may be readily attached to most standard baby strollers for protecting an infant or older child against sunlight or rain and the like.

2. PRIOR ART

The prior art is rife with disclosures of inventions relating to canopies for protecting the user against incident sunlight or rain and the like.

U.S. Pat. No. 3,840,161 to Boggs, et al, is directed to a detachable canopy for a child carrying device. The canopy has a frame section and a covered section which can be a form of a lightweight material such as fabric or plastic. The frame legs are detachably mounted to the handlebars. This reference does not provide for a disposable type of system made out of cardboard.

U.S. Pat. No. 4,112,952 to Biven is directed to a sun shield for backpackers. The canopy includes body members which give body to the side flaps and the front flap. Thus, this is a cardboard type canopy system which, although not particularly foldable, is formed of a disposable type of material such as cardboard.

U.S. Pat. No. 4,215,711 to Hermanson is directed to a disposable umbrella made up of a paperboard material. This provides both a disposable and foldable canopy of paperboard material. This is not adapted particularly for a canopy to be used with a stroller.

U.S. Pat. No. 3,556,546 to Garner is directed to a baby stroller and a canopy in combination with the canopy frame.

U.S. Pat. No. 4,062,369 to Hermanson is directed to a disposable rain and weather protector and as can be seen in FIGS. 6-8 is foldable. This is particularly directed to an umbrella 1 which includes the canopy and is die cut.

U.S. Pat. No. 3,258,291 to Ezquerra is directed to an infant supporting device and includes the canopy which is removably mounted to the back of the chair. The canopy is believed to be formed of a fabric material.

Unfortunately, nowhere in the prior art known to the applicant is there any disclosure of a portable, foldable canopy that is adapted for easy storage in a flat configuration while also being adapted for simple and expedient unfolding and attachment to standard baby strollers for protecting a baby or older child against sunlight and other external elements.

SUMMARY OF THE INVENTION

The present invention comprises a canopy that is especially suited for attachment to and used with strollers such as those commonly used for transporting young children. The canopy of the present invention is foldable and easily connected and removed from the stroller so that it may either be stored easily such as within the stroller structure itself in a flat folded configuration or unfolded and expediently attached to the stroller to provide a spaced, overhead covering for the child in the stroller. The invention comprises a top member, two side members and a rear member, all preferably formed from a planar unitary body, shaped, cut or otherwise configured to conform to a pattern providing the various member shapes and relationships as described hereinafter. More particularly, the rear member of the present invention is provided with a plurality of connecting members, each having foldable tabs associated therewith and the side members of the present invention are provided with a plurality of corresponding slots adapted to receive the connecting members including the aforementioned tabs. Upon insertion into the slots, the connecting members and tabs establish an interconnection between the side members and the rear member in a folded configuration that secures the canopy to the stroller. The canopy of the present invention, although adapted for manufacture from a variety of different materials, is preferably made of a lightweight, easily folded and inexpensive material such as cardboard, plastic or rigidized cloth.

OBJECTS OF THE INVENTION

It is therefore a principal object of the present invention to provide a portable, foldable canopy for baby strollers which can be readily attached to a standard stroller or alternatively folded into a flat configuration for easy portability and storage.

It is another object of the present invention to provide a foldable canopy for strollers for children, the canopy being of a configuration which may be readily attached to the stroller with a mininium of time-consuming connecting steps.

It is still an additional object of the present invention to provide a foldable canopy for baby strollers of a universally usable configuration and which is adapted for simple and expedient attachment to a stroller for positioning above the child in the stroller for blocking otherwise incident sunlight or detrimental elements such as rain, snow and the like.

It is still an additional object of the present invention to provide a portable, foldable canopy primarily for baby strollers and the like, the canopy being fabricated from a flat material cut into a predetermined pattern, foldable into an even smaller, flat configuration for easy storage thereof and being readily folded into a deployed configuration around a standard stroller at a position above and spaced from the child in the stroller where it can be used to prevent sunlight and other undesireable elements from reaching the child.

BRIEF DESCRIPTION OF THE DRAWINGS

The aforementioned objects and advantages of the present invention as well as additional objects and advantages thereof will be more fully understood hereinafter as a result of a detailed description of a preferred embodiment when taken in conjunction with the following drawings in which:

FIG. 5 is an isometric view of the canopy of the present invention showing its configuration during installation on a stroller; and FIG. 6 is a rear-directed plan view of the present invention showing specifically how the side members and the rear member of the canopy are interconnected for installation on a stroller.

DETAILED DESCRIPTION OF A PREFERRED EMBODIMENT

Figure 2:
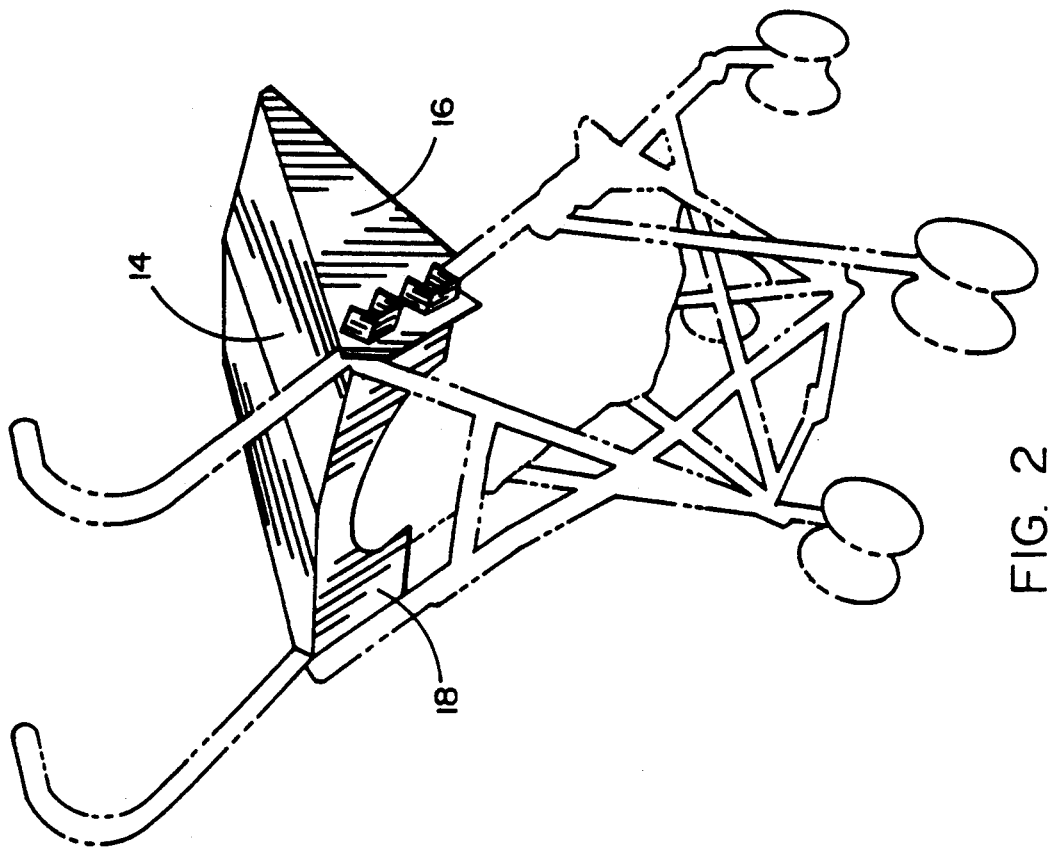
FIG. 2 is a rear-facing isometric drawing of the canopy of the present invention, also illustrating its configuration as installed on a stroller.
Figure 1:
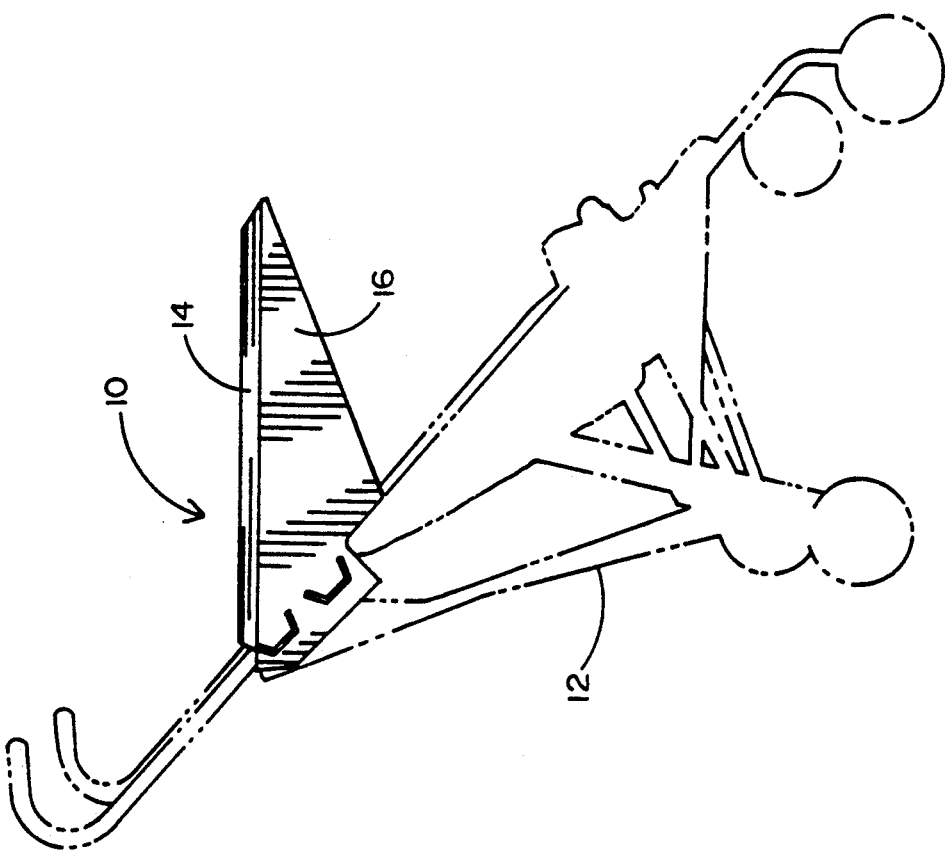
FIG. 1 is a side view of the canopy of the present invention shown installed on a stroller, the latter being shown in phantom.

Referring to FIGS. 1 and 2, it will be seen that the foldable canopy 10 to the present invention, which is adapted to be installed on a stroller 12 shown in FIGS. 1 and 2 in phantom, comprises a top member 14, a pair of side members 16 and a rear member 18. The canopy of the present invention is designed to be installed on a relatively standard stroller so that the top member is positioned on a substantially horizontal plane that is generally parallel to the surface on which the child is normally seated in the stroller. On the other hand, the side members 16 are adapted to be positioned substantially perpendicular to the seating surface of the child or more specifically, perpendicular to the top member 14. It will also be observed that the rear member 18 is designed to be substantially parallel to the vertical or diagonal handle bar members to the stroller, thereby making an acute angle with the top member 14 while being substantially perpendicular to the side member 16.

The configuration to canopy 10 permits it to be supported at a position above and separated from the stroller's child support seat. Thus, without interfering with the position and comfort of the occupant of the stroller, the canopy provides a method to preventing much of the incident sunlight from reaching the child.

Figure 3:
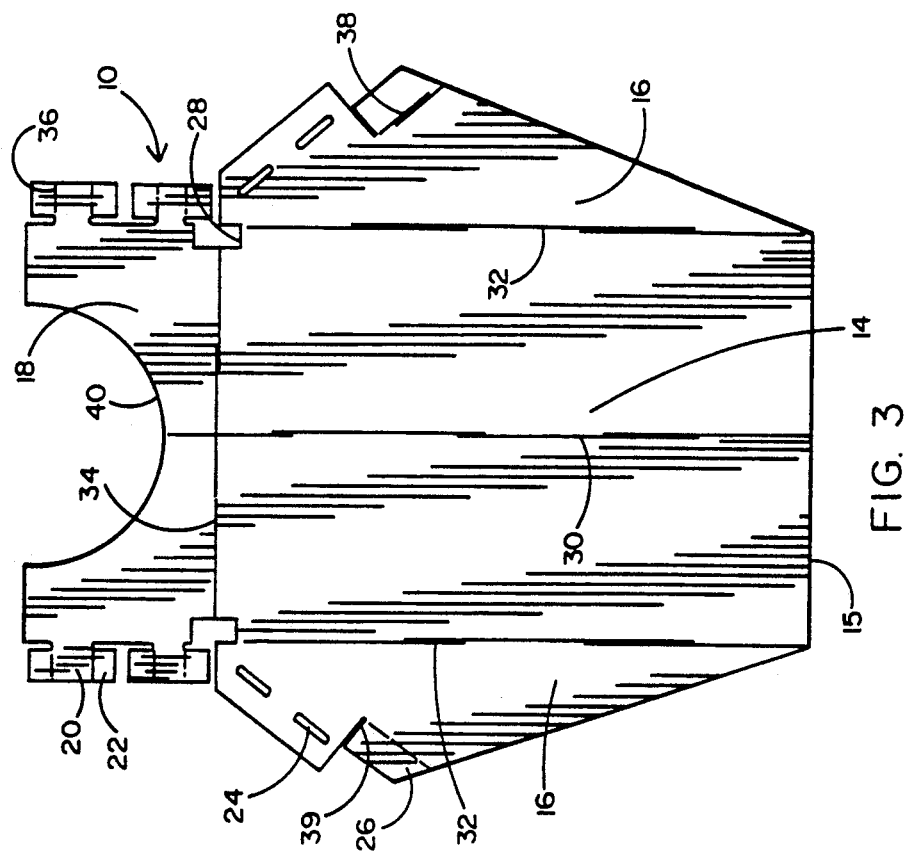
FIG 3 is a plan view of the canopy of the present invention shown in its flat, fully unfolded configuration.

In its preferred embodiment, the canopy 10 of the present invention is fabricated from one flat or planar, unitary material which is cut into a predesigned pattern and then provided with score lines to permit easy folding at the desired fold points. This pattern of planar material is shown in FIG. 3. As seen in FIG. 3, the canopy 10 of the present invention is, in its planar or flat and unfolded configuration, predominantly comprises top member 14 which is of a rectangular configuration having one side 15 that is tree, the other side opposite the free side having extending therefrom the rear member 18. Top member 14 has extending from its longer sides a pair to respective side members 16. Rear member 18 is cut to provide four connecting members 20, each having a pair of tabs 22. Similarly, side members 16 are cut to provide corresponding pairs of slots 24 which are, as will be seen hereinafter, adapted to receive the connecting members 20 when each of the tabs 22 is folded 180 degrees into a flat overlapping configuration relative to its corresponding connecting member. After the various members of the canopy 10 are folded around the handlebars of a stroller, the position of connecting members 20 and slots 24 make it possible to interconnect those elements and tabs 22 provide a convenient means for securing those interconnections so that the canopy is firmly and securely attached to the stroller.

Each side member 16 is also provided with a folding member 26 which is immediately adjacent the corresponding pairs of slots 24. The folding members 26 are designed to bear against the handlebars of the stroller for supporting the canopy in its proper position relative to the stroller. As will be seen further in FIG. 3, on each side of the rear member 18 at a position which overlaps the top member 14 and immediately adjacent the respective side members 16, there is provided a rectangularly shaped notch 28, the purpose of which, as will be seen hereinafter, is to provide passageways through the canopy so that the rear member 18 and the side members 16 may be attached around the tubular handlebars of the stroller.

The canopy of the present invention also provides a plurality of score lines or fold lines. These fold lines are provided in the preferred embodiment in order to facilitate easy folding of the various members of the canopy for both storage and attachment to a stroller. More specifically, as seen in FIG. 3, there is provided a score line 30 which preferably extends through the center of the top member 14 and rear member 18 from the aforementioned free end 15. In addition, there are score lines 32 on each side of the top member 14 from which a side member 16 extends. A similar score line 34 is provided between the rear member 18 and the top member 14. Each connecting member 20 is also provided with a score line 36 on two edges, from which extend the tabs 22. Each of folding members 26 is provided with a defined score line 38 to permit easy folding of the folding member 26 relative to the remaining portion of the side member 16. Folding of members 26 is further facilitated by a cut or separation 39 between the edge of folding member 26 and that portion to the side member adjacent the slots 24. Furthermore, in the preferred embodiment of the invention illustrated herein, the rear member 18 is provided with a semicircular shaped cutaway 40 which is an optional feature to the invention which is designed to permit more convenient observation and manual access to the child with the canopy in place on the stroller.

Figure 4:
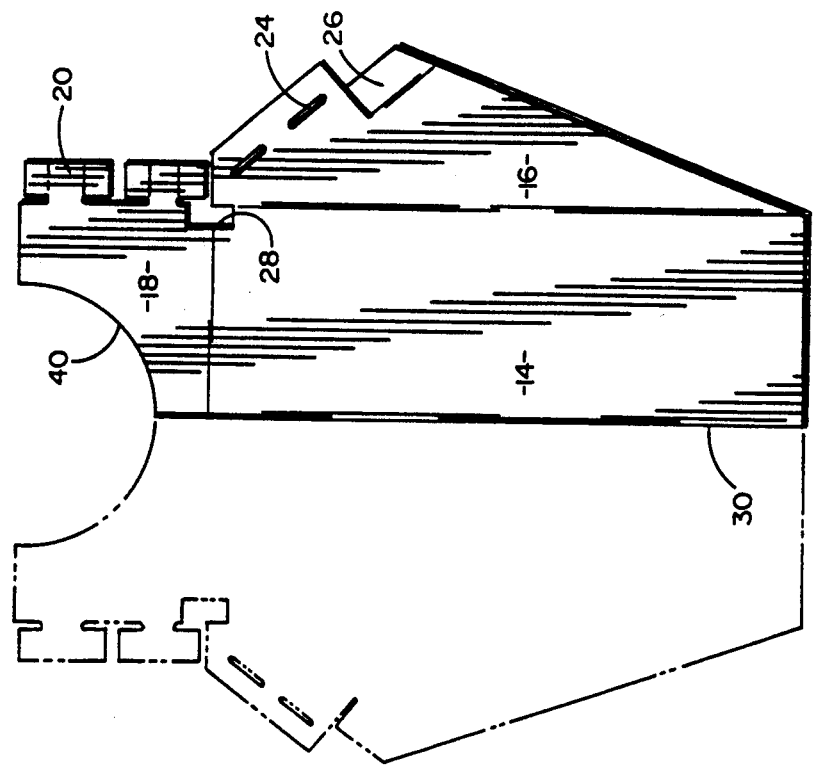
FIG. 4 is a plan view to the canopy of the present invention shown in its storage configuration.

FIG. 4 provides a view of the present invention similar to that of FIG. 3 but showing the canopy in its storage configuration wherein one side of the canopy is folded about the score line 30. Folding the canopy 10 in this configuration still provides a flat, readily stored shape, but of one halt the surface area of the fully unfolded configuration of FIG. 3 and twice the thickness, thereby making it more sturdy and less likely to be damaged during storage. It is also to be noted by virtue to the congruency of the two layers folded one on top of the other in FIG. 4, that the left side of the canopy, that is the side on the left of fold line or score line 30, is the mirror image of the portion of canopy 10 that is on the opposite side to fold line 30. It will be understood that in this configuration, side members 16 may also be folded to rest between the fold portions to top member 14 to further reduce the storage surf ace area.

Referring now to FIGS. 5 and 6, it will be seen that installation of the canopy 10 onto a stroller is a relatively simple matter because to the unique pattern of the present invention. More specifically, as seen in FIG. 5, the canopy 10 is preferably placed onto the stroller with the side members 16 already folded to be substantially perpendicular to the top member 14, while the rear member 18 is substantially parallel to and co-planar with the top member 14. In this configuration, the stroller's tubular handlebars are readily received in the notches 28. The connecting members 20 of the rear member 18 extend around one side of each handlebar in a position for interconnecting with the slots 24 of side member 16 when the top member 14 is lowered by bending it around score line 34 into its horizontal position. This horizontal position is shown in FIG. 6. In FIG. 6, it is seen that the lowering of the top member 14 into its horizontal position brings the side member 16 into the appropriate position for the slots 24 to mate with the tabs and connecting members 22 and 20, respectively. The tabs 22 provide a means of affixing the connecting members through the slots 24 so that they cannot be inadvertently detached from one another. Furthermore, it will be seen that the folding to top member 14 into its horizontal position around fold line 34 brings the fouling member 26 of each side member 16 into a position where it can rest against the corresponding stroller handlebar immediately below the notch 28 through which each such handlebar extends.

Removing the canopy 10 from the stroller 12 is readily accomplished by simply reversing the previously described steps. Thus, it can be seen that the canopy of the present invention is of a relatively simple and low cost structure which can be folded for easy storage and portability and is, at the same time, readily folded into attachment to a stroller while requiring relatively few steps and a minimum of time for attachment or detachment from the stroller.

It will now be understood that what has been disclosed herein comprises a novel, foldable canopy, primarily for baby strollers and the like. The canopy comprises a top member, a rear member and a pair of side members formed from a unitary planar foldable material such as cardboard, plastic and the like. The material is cut and scored to provide a preselected pattern which when folded into its fully assembled configuration, provides a convenient means for attachment to a stroller for blocking sunlight, rain, snow and other inclement environmental conditions which might otherwise reach the child in the stroller to which the canopy is connected. The canopy is configured to be installed at a position above and separated from a child in the stroller so that it does not otherwise interfere with the safety and comfort of the child.

Those having ordinary skill in the art to which the present invention pertains will now, as a result of the applicant's teaching herein, perceive various modifications and additions which may be made to the invention. By way of example, the particular pattern and techniques for interconnecting the various elements thereof disclosed herein for use on a baby stroller may be readily altered to accommodate various differences in the structures of baby strollers or other wheeled equipment such as wheelchairs and the like. Furthermore, various additions may be made to the canopy such as by adding an additional member to the otherwise free end of the top member disclosed herein to provide additional protection for the child in the form of a vertically hanging member to prevent glare or reflection to sunlight from reaching the child's face or eyes. Accordingly, all such modifications and additions are deemed to be within the scope of the invention which is to be limited only by the claims appended hereto.

I claim:

1. A foldable canopy for use on strollers, the strollers of the type having a pair of spaced vertical or diagonal tubular members merging into handles for pushing the stroller; the canopy comprising:

a top member;

a pair of side members extending from and foldable about respective opposed sides of said top member;

a rear member extending from and foldable about a third side of said top member;

said top member, said side members and said rear member all forming integral elements of a unitary planar member;

means for securing said side members to said rear member in a fold configuration substantially perpendicular to said top member and in supportive engagement with said tubular members of a stroller; and wherein said securing means comprises connecting members on said rear member and corresponding slots on said side members, said connecting members and said slots being designed for interconnection when said canopy is installed on a stroller.

2. The canopy recited in claim 1 wherein said connecting members each comprise foldable tabs for selectively affixing said connecting members in said slots.

3. A foldable canopy for use on strollers, the strollers of the type having a pair of spaced vertical or diagonal tubular members merging into handles for pushing the stroller; the canopy comprising:

a top member;

a pair of side members extending from and foldable about respective opposed sides of said top member;

a rear member extending from and foldable about a third side of said top member;

said top member, said side members and said rear member all forming integral elements of a unitary planar member;

means for securing said side members to said rear member in a folded configuration substantially perpendicular to said top member and in supportive engagement with said tubular members of a stroller; and wherein said top member and said rear member having fold lines for folding of said unitary planar member precisely flat.

* * * * *